Patented Feb. 29, 1944

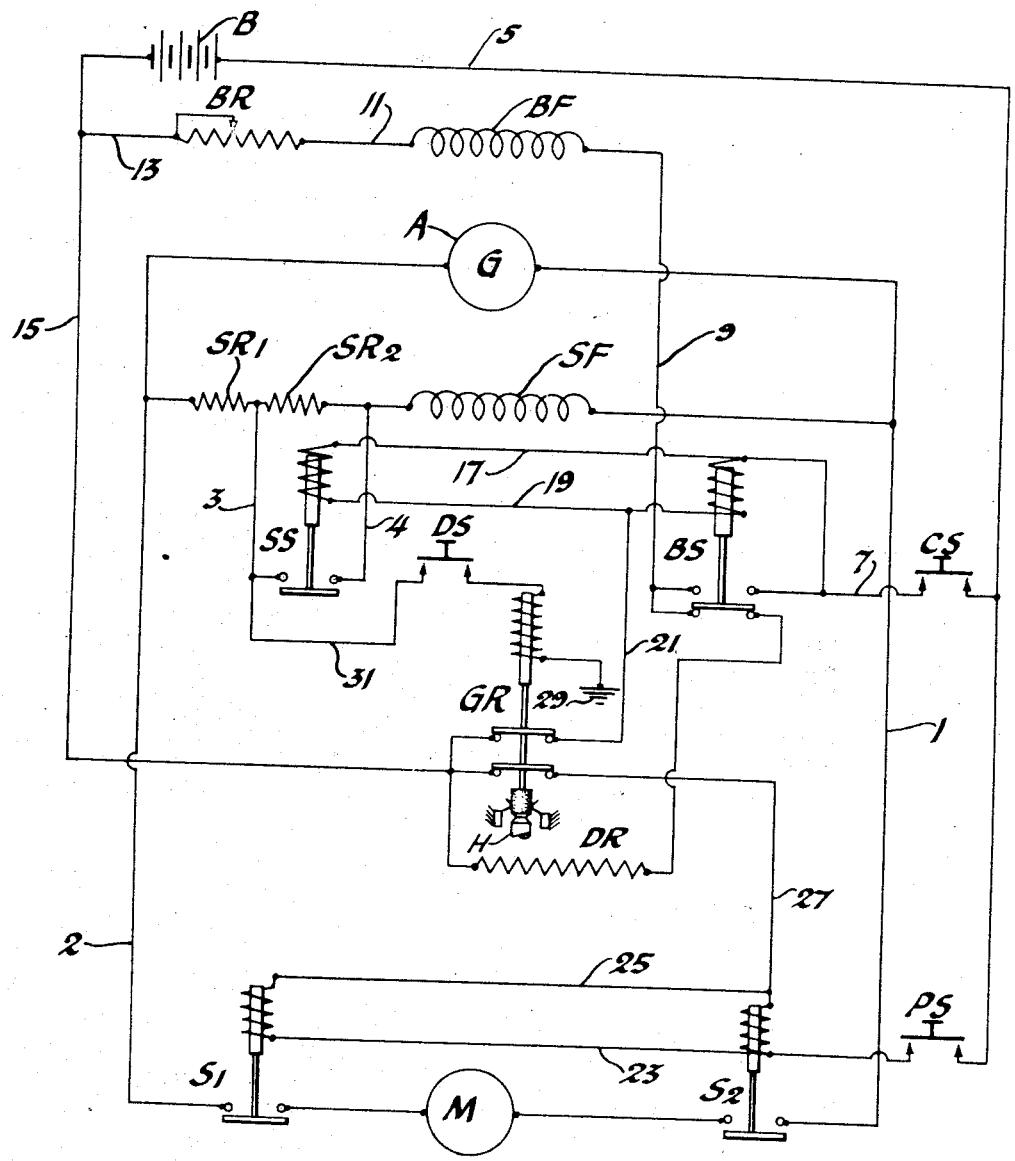

2,342,845

UNITED STATES PATENT OFFICE 2,342,845

ELECTRICAL PROTECTIVE SYSTEM

Stuart H. Cowin, Chicago, Ill., assignor to General Motors Corporation, Detroit, Mich., a corporation of Delaware Application January 9, 1941, Serial No. 373,716

9 Claims. (Cl. 175—294)

My invention relates in general to electrical protective systems and more particularly to an improved arrangement of leakage current responsive ground protective means in an electrical circuit to increase the effectiveness and efficiency of such protective systems.

In conventional systems of this type the protective means is generally connected in equipotential relation between both sides of the power circuit and ground by being connected between ground and the mid-point of a resistor which is connected directly across the power line and accordingly constitutes a continuous power loss. To reduce this continuous power loss, the resistance of this shunt resistor is made high and therefore greatly limits the current through the current responsive protective means to a low value. The current responsive means used with this arrangement is, therefore, usually a galvanometer relay which controls power operated circuit breakers or isolation switches to open a section of the power line should a ground occur therein.

On prime mover generator power plants, particularly those where the load demand is substantially equal to the rated load of the prime mover and generator, such as those used on electrically driven vehicles, it is desirable to protect the generator as well as the load circuit against grounds, and also to insure that no one will receive an electrical shock from the generator or load circuit when a ground occurs in any part of the power system. It will be evident that conventional systems in which only the load circuit is disconnected from the generator when a ground occurs in the load circuit do not provide adequate protection of the generator for grounds occurring in the circuit between the generator and load circuit disconnecting means or protection against shocks from the generator.

With my improved arrangement a single powerful current responsive relay is connected with the generator circuit so that all parts of the generator and the load circuit are equally protected against grounds and flashover of the generator or motors included in the load circuit upon leakage of current to ground from any part of the generator or load circuit. This constitutes the principal object of my invention.

Another object resides in combining the current responsive relay as part of the generator shunt excitation circuit, thus eliminating the usual continuous power loss present in conventional arrangements and increasing the efficiency of the protective system and also increasing the effectiveness of the relay by connecting it in low resistance relationship with both sides of the power circuit.

Another object is the provision of means controlled by the protective means to open the generator load circuit and simultaneously to reduce the voltage of the generator to substantially zero, so that no one may receive an electrical shock therefrom, providing adequate protection of the electrical means against damage from grounds and flashover and of the personnel against shocks.

The combination of the protective means and its arrangement in relation with the generator and power circuits by which the above objects are accomplished will be better understood by referring to the single diagrammatic drawing illustrating my improved protective system and the following detailed description thereof.

Referring now to the drawing, the power circuit includes a generator G having an armature A, a motor M and power operated contactors S1 and S2 for closing and opening both sides of the power circuit comprising the power conductors 1 and 2 by which the motor is connected to the generator upon closure of the switches S1 and S2. The armature A of the generator may be driven by any type of variable speed prime mover and the motor M constituting the electrical load on the generator may be connected in any well known manner to drive a load such as the wheels of a vehicle. If a plurality of motors are used the contactors S1 and S2 may be arranged to connect the motors in either a series or parallel relation with the generator in conventional manner.

The generator G is shown provided with self and separately excited excitation circuits, constituting the means whereby the voltage and output of the generator are regulated.

The self or shunt excitation circuit, shown, includes a shunt field winding SF and rheostats SR1 and SR2 connected in series across the power line conductors 1 and 2. A power operated contactor SS is provided to normally shunt out the resistor SR2 of high resistance so that normal shunt excitation current flows in the shunt excitation windings SF. The shunt excitation current in this circuit, therefore, is normally limited by only the resistance of the winding SF and that of the rheostat SR1, both of these resistances being of low value. A differential series field generator winding may also be provided if desired. However, it is not shown. The rheostat SR1 is the conventional fixed resistor usually placed in series with the shunt field winding SF of generators to enable the size of the shunt field coil windings to be reduced, and this resistor is usually provided with suitable taps to vary its resistance slightly in order to obtain the proper excitation current through the shunt field coils, which usually vary slightly in resistance due to manufacturing differences, so that rated generator voltage and output are obtained.

The separately excited excitation circuit includes a field winding BF, an adjustable rheostat BR, a manually operable control switch CS and a power operated contactor BS. The control switch CS, together with the protective means to be described, serves to control the contactors SS and BS, the latter serving to connect or disconnect the separately excited field winding to a battery B and to connect this winding to a discharge resistor DR when disconnected from the battery.

Each of the contactors S1, S2, SS and BS is shown provided with fixed contacts, and one or more contacts fixed to an armature which are movable upward from the position shown by an electromagnetic actuating coil. Energization and de-energization of these coils are controlled jointly by protective means acting automatically in response to leakage current from any part of the power circuit, shown as a relay GR, and the manually operable control switches CS and PS. It will be evident that these contactors may be operated by means other than the electromagnetic means shown.

The relay GR is provided with fixed contacts and contacts shown bridging the fixed contacts which are fixed to an armature which is movable upward from this position upon energization of the electromagnetic actuating coil also shown. The connection of this coil between ground and the shunt excitation circuit, to be described, permits ample attractive force to be exerted by the coil on the armature. Holding or detent means, shown schematically at H, is provided to retain the relay armature in its upward or open position. This means includes a detent groove in the armature and stationary resilient detent fingers placed so that they will enter the detent groove when the armature is moved to its open position. Movement of the armature of the relay back to its closed position is accomplished manually. A disconnecting switch DS is provided in series with the actuating coil to cause de-energization thereof so that the armature may then be moved manually downward to its closed position in which it is shown.

The energization and control connections extending between the above described contactors, switches, relay and generator shunt excitation circuit will now be described.

The rheostats SR1, SR2 and shunt field winding SF, as has been previously described, are connected in series across the power line conductors 1 and 2 and, as shown, conductors 3 and 4 serve to connect the rheostat SR2 across the fixed contacts of the conductor SS.

The separately excited field winding BF is shown connected in series with the battery B, the control switch CS, the upper pair of fixed contacts of the contactor BS and rheostat BR by conductors 5, 7, 9, 11, 13 and 15. The contactor BS is provided with an additional lower pair of fixed contacts shown bridged by the armature contact. One of the lower and one of the upper fixed contacts are connected to the conductor 9 and a discharge resistor DR is connected between the other lower fixed contact of the contactor BS and the conductor 15.

The electromagnetic actuating coils of the contactors SS and BS are connected in parallel by conductors 17 and 19, the conductor 17 being connected to the conductor 7 and the conductor 19 being connected by a conductor 21 to the upper right hand fixed contact of the relay GR, the left upper and lower contacts of which are connected to the conductor 15.

The electromagnetic actuating coils of the line contactors S1 and S2 are connected in parallel by conductors 23 and 25, the conductor 25 being shown connected to the right lower fixed contact of the relay GR by a conductor 27 and the conductor 23 being shown connected to one contact of the control switch PS, the other contact of which is connected to the conductor 5.

The actuating coil of the relay GR has one terminal connected to ground at 29 and the other terminal is connected by a conductor 31 to the conductor 3.

The operation of the protective system with the switches, contactors and relay in the position is as follows:

Closure of the manually operable control switch CS causes energization of the actuating coils of the contactors SS and BS from the battery B through the conductors 5, 7, 17, 19, 21 and 15, which causes upward movement of their armatures into bridging relation with the upper fixed contacts thereof. Bridging of the fixed contacts of contactor SS shunts the resistor SR2 of high resistance out of the generator shunt excitation circuit, and the bridging of the upper pair of fixed contacts of contactor BS connects the separately excited field winding BF and rheostat BR in series with the battery through conductors 5, 7, 9, 11, 13 and 15.

Closure of the manually operable control switch PS causes energization of the coils of the line contactors S1 and S2 through conductors 5, 23, 25, 27 and 15, which causes upward movement of their armatures to bridge the fixed contacts thereof to connect the motor M across the generator G through the conductors 1 and 2 constituting the power line.

With the contactors SS, BS, S1 and S2 closed and the armature A of the generator driven at some selected speed by the prime mover, the output of the generator is regulated by both the shunt and separately excited field windings of the generator. The excitation current in both windings is regulated by the adjustable rheostat BR to regulate the generator output. Variations in the prime mover and generator output to satisfy variations in the power demand by the motor are regulated by adjustment of the prime mover and generator speed by any well known form of manually operable prime mover speed control means and/or a conventional prime mover governor, not shown, and by adjustment of the rheostat BR controlled either manually or by the prime mover governor in a well known manner.

The relay GR is inactive for normal operation of the generator and motor, the normal position of the armature of the relay being as shown. Should, however, a ground or flashover to ground occur in any part of the motor, generator or power circuit, the current leakage to ground will flow through the actuating coil of the relay with the coil connected as shown. Assuming that a ground occurs on the power conductor 1, leakage current will flow between conductors 1 and 2 through the coil of the relay and rheostat SR1 in series therewith as one side of the relay coil is grounded and the rheostat SR2 is normally shunted. The shunt field winding SF is accordingly shunted and its field will collapse. If conductor 2 becomes grounded leakage current will flow between conductors 1 and 2 through the coil of the relay and the shunt field winding, the rheostat SR1 likewise being shunted in this case. The resistance of the rheostat SR1 and the shunt field winding SF are low in value and the resistance of the relay coil GR is also made low so that ample magnetic pull is exerted by the relay coil to attract and move the armature upward. This connection accordingly renders the relay effective to control a plurality of devices as the armature is moved promptly out of contact with the fixed contacts due to the large pull exerted by the coil on the armature.

The resistance of the rheostat SR1 and the resistance of the shunt field winding SF and the inductance thereof are selected so that substantially equal current will flow through the relay coil irrespective of which side of the circuit becomes grounded and it will be evident that the relay coil is connected in unequal resistance and inductance relationship with either side of the circuit to obtain equal response to grounds in any part of the circuit. It will likewise be evident that leakage current to ground caused by a flashover of either the generator or motor will likewise cause the leakage current to flow through the relay coil and either the rheostat SR1 or shunt field winding SF in series therewith depending upon the potential to ground of the flashover, but as the resistances of both the rheostat and the shunt field winding are of low value the current through the relay coil will be ample to cause it to attract and move its armature upward from the normal position in which it is shown.

When the relay armature is moved upward due to leakage current to ground from any part of the power circuit flowing through the relay coil, the energizing connection between conductor 15 connected to one battery terminal is broken and accordingly all the coils of the contactors, namely, S1, S2, SS and BS, will be deenergized and these armatures will drop to the position shown. The armatures of contactors S1 and S2 in dropping to the position shown disconnect the motor M from both sides of the power circuit and the generator G to prevent damage to the motor and both sides of the load circuit, and the armatures of contactors SS and BS in dropping to the position shown cause the high resistance SR2 to be inserted in series relation with the shunt field circuit, and the separately excited field winding to be disconnected from the battery B, which reduces the voltage of the generator to substantially zero, thus protecting the generator and its circuit connections and making it impossible for anyone to receive a shock therefrom. The discharge resistor DR is connected directly across the separately excited field winding BF upon the dropping of the armature of contactor BS to the position shown in order to dissipate the energy stored in this inductive winding. The relay armature will be retained in its upward position by the retaining means described so that the power system is rendered safe and the various circuits may be tested for grounds while in this position. Upon repair of the grounded conductor the relay armature is moved downward normally to its normal position, as shown.

As previously mentioned the generator G may be provided with a differential series field winding, in which case the field from it opposes the fields from the shunt and separate field windings so that the combined generator field will be promptly and effectively reduced to zero upon action of the relay to control the shunt and separate fields in the manner described above.

It will be evident that my protective system and arrangement operates without power loss as long as the power circuit and electrical machines included therein function normally, and that a sturdier and more powerful protective relay which is not affected by vibration may be used to effectively protect the power circuit and generator circuit against grounds and render the entire power system and circuit safe against electrical shocks.

I claim:

1. In a protective system of the type described comprising a generator having a shunt excitation circuit which includes both inductance and resistance switching means normally shunting the major portion of said resistance but operable to include this portion of said resistance in order to reduce the generator voltage to a low value, a generator load circuit including disconnecting means, and current responsive protective control means for simultaneously controlling operation of said switching means and said load circuit disconnecting means, said protective control means being connected between ground and a point in the generator shunt excitation circuit which is normally at equipotential relation with all parts of said generator so that it acts with equal response to leakage current from any part of the generator or load circuit.

2. In a protective system of the type described comprising a generator having a shunt excitation circuit which includes both inductance and resistance and a separately excited excitation circuit, including means for opening said circuit, a load circuit for said generator having means for opening said circuit, and current responsive protective means connected between ground and a point in said generator shunt excitation circuit which is normally at equipotential relation with the generator terminals so that it acts with equal response to leakage current from said power circuit or generator to simultaneously control the means for opening the separately excited excitation circuit and the means for opening said power circuit so that the voltage of said generator is substantially reduced, rendering both the generator and the power circuit safe against electrical grounds or electrical shock due to grounds.

3. In a ground protective system for electrical circuits comprising a compound generator having shunt and separately excited excitation circuits, excitation reducing means in each of said circuits operable for causing the voltage and output of the generator to be reduced to substantially zero voltage, a current responsive relay including an actuating coil having one side grounded, an armature movable by said coil upon energization thereof to control operation of said excitation reducing means in said generator excitation circuits, means for retaining said armature in the position to which it is moved by said coil, and means operable at will for connecting the other side of said coil to a point in said shunt excitation circuit where the normal potential difference between said point and each of said generator terminals is substantially equal whereby it is energized only by leakage of current to ground from any part of said generator caused by defective insulation or flashover so that said generator is effectively protected against damage.

4. In a protective system of the type described comprising a generator having a shunt excitation circuit including an excitation winding, a resistance in series therewith and switching means normally shunting a portion of said resistance and operable to insert all of said resistance in series with said winding to reduce the generator voltage to a low value, and leakage current responsive means connected between ground and the portion of the resistance normally shunted for controlling operation of said switching means.

5. In a protective system of the type described comprising a generator having a shunt excitation circuit including an excitation winding, a resistance in series therewith, switching means normally shunting a portion of said resistance connected adjacent the excitation winding, said switching means being operable to insert all of said resistance in said circuit, an external generator load circuit including switching means for opening said load circuit, and current responsive means connected between ground and said portion of the resistance normally shunted so that said current responsive means is adapted to act only upon leakage of current to ground from either side of said generator and external load circuit to control operation of both said switching means thereby causing a substantial reduction in the generator voltage and opening the load circuit.

6. In an electrical protective system of the type described comprising a generator having a shunt excitation circuit and a separate excitation circuit, the shunt excitation circuit comprising a low resistance field winding, a resistance unit of a resistance substantially equal to that of the field winding, and a resistance unit of high resistance, all connected in series relation, and also a contactor operable to shunt the high resistance unit, the separate excitation circuit comprising a field winding, a field rheostat, a separate source of current and a contactor, all connected in series, said last named contactor being operable to complete the separate excitation circuit, and control means for controlling operation of all of said contactors comprising series connected manually operable switching means and current operated switching means, said current operated switching means having a current operating coil connected between ground and the common connection between the high and low resistance units for energizing only by any slight leakage of current from either of the generator terminals to ground to cause operation of the current operated switching means to render the manually operable switching means incapable of controlling normal operation of said contactors and thereby simultaneously to cause insertion of the high resistance unit in the shunt field circuit and opening of the separately excited circuit independently of the manually operable control means.

7. In an electrical protective system of the type described comprising a generator, a load circuit therefor comprising a motor and contactors operable for connecting both generator terminals to both sides of the load circuit or disconnecting them therefrom, excitation means for said generator comprising a shunt excitation circuit and a separately excited excitation circuit, the shunt excitation circuit comprising a low resistance field winding, a resistance in series therewith and a contactor operable for allowing or preventing the flow of current through a portion of said resistance, the other portion of the resistance being substantially equal to the resistance of said winding, the separately excited excitation circuit comprising a field winding, a separate source of current and a contactor operable for connecting the source of current to the circuit or disconnecting it therefrom, and means for controlling all of said contactors, said control means comprising manually operable means and current responsive means said current responsive means connected between ground and the common connection between the field winding and the resistance in the shunt excitation circuit to act only in response to leakage of current from any part of said generator or said generator load circuit, said current responsive control means being connected to said manually operable control means in such manner that when there is no leakage of current to ground the current responsive means is inactive and then permits the contactors to be normally controlled by said manually operable control means, but upon leakage of current to ground the current responsive means acts automatically to render the manually operable control means ineffective to control operation of said contactors, which causes all of said resistance to be inserted in the shunt excitation circuit and causes both the separately excited excitation circuit and both sides of the power circuit to be opened.

8. In a protective system of the type described comprising a load circuit including a generator, connecting means for connecting both sides of said load circuit across the generator, a generator excitation circuit connected in shunt relation with the load circuit, said excitation circuit comprising an exciting winding, a resistance in series therewith, and shunting means normally shunting the major portion of the resistance to permit normal excitation of the generator, and a ground protective means having an actuating winding, means movable to an operative position by the actuating winding, when energized, to render said load circuit connecting means and said resistance shunting means inoperative, detent means for retaining said movable means in operative position and means for connecting said actuating winding of said protective means between ground and the common connection between the field winding and the resistance in the generator shunt excitation circuit for energization by leakage of current to ground from either side of said generator or said circuits energized thereby, said connecting means for said actuating winding including a manually operable disconnecting switch.

9. In a protective system of the type described comprising a compound generator having shunt and separately excited excitation circuits, the shunt excitation circuit comprising a low resistance excitation winding, a resistor of substantially the same resistance as the excitation winding, a discharge resistor of high resistance, said resistors being connected in series, and a contactor connected across the discharge resistor which is operable to shunt the discharge resistor, the separately excited excitation circuit comprising an excitation winding, a rheostat, a discharge resistor, a separate source of current, and a contactor normally connecting the separate excitation winding, rheostat and discharge resistor in series, said second mentioned contactor being operable to disconnect the discharge resistor and to connect the separate excitation winding and rheostat to said separate source of current, a generator power circuit including contactors operable to connect both sides of the power circuit to the generator, series connected manually operable means and current responsive means for controlling operation of all of said contactors, means for connecting said current responsive means between ground and the generator shunt excitation circuit so that it acts only upon energization by leakage of current from any part of said generator or any part of any circuit supplied by said generator to render said contactors inoperable independently of said manually operable control means but normally allowing control and operation thereof by said manually operable means when there is no leakage of current from the power circuit, said current responsive means being provided with holding means to retain said current responsive means in the active position.

STUART H. COWIN.